United States Patent [19]

Smith

[11] Patent Number: 4,777,581
[45] Date of Patent: Oct. 11, 1988

[54] MODULATION METHOD AND APPARATUS FOR STATIC POWER FREQUENCY CHANGERS

[76] Inventor: Gregory P. Smith, 3/17-21 Old Taren Point Rd., Taren Point, New South Wales 2229, Australia

[21] Appl. No.: 56,482
[22] PCT Filed: Aug. 26, 1986
[86] PCT No.: PCT/AU86/00250
§ 371 Date: Apr. 20, 1987
§ 102(e) Date: Apr. 20, 1987
[87] PCT Pub. No.: WO87/01529
PCT Pub. Date: Mar. 12, 1987

[30] Foreign Application Priority Data

Aug. 26, 1985 [AU] Australia .............................. PH2128

[51] Int. Cl.$^4$ .......................................... H02M 5/257
[52] U.S. Cl. ..................................... 363/161; 363/164
[58] Field of Search ................. 363/160, 161, 164, 165

[56] References Cited

U.S. PATENT DOCUMENTS

| | | | |
|---|---|---|---|
| 3,585,485 | 6/1971 | Gyugyi et al. | 363/161 |
| 3,585,486 | 6/1971 | Gyugyi . | |
| 3,593,106 | 7/1971 | Lafuze | 363/161 |
| 3,636,423 | 1/1972 | Jenkins | 318/227 |
| 3,832,624 | 8/1974 | Gilmore . | |
| 4,013,937 | 3/1977 | Pelly . | |
| 4,307,444 | 12/1981 | Stacey et al. | 363/161 |

FOREIGN PATENT DOCUMENTS

| | | |
|---|---|---|
| 0029252 | 5/1981 | European Pat. Off. . |
| 0029251 | 5/1981 | European Pat. Off. . |
| 0029250 | 5/1981 | European Pat. Off. . |
| 0029249 | 5/1981 | European Pat. Off. . |
| 1309641 | 10/1970 | United Kingdom . |

OTHER PUBLICATIONS

"Static Power Frequency Changers", by L. Gyugyi and Pelly 1976 Excerpts: Title pg, Preface, Table of Contents, Nomenclature and pp. 298-308.
"Line-Commutated Frequency Changers for Speed Control of Electrical Machines", 1983 Excerpts: Title pg, p. 6; pp. 88-101 and Bibliography (p. 117).
"Microprocessor Control of a Cycloconverter", Robert E. Betz and Robin J. Evans, IEEE Transactions on Industrial Electronics, vol. 32, No. 2, May 1985, pp. 120-129.

Primary Examiner—Patrick R. Salce
Assistant Examiner—Marc S. Hoff
Attorney, Agent, or Firm—Jones, Tullar & Cooper

[57] ABSTRACT

The performance of the cycloconverter when used to drive an induction motor is at present limited because of inadequate methods of modulating the thyristor conduction angles. The main problems are: low maximum frequency due to subharmonics; voltage distortion due to discontinuous current and to uncertainty of current cross-over (for non-circulating current mode); and poor power factor on the input. This specification describes a modulation method which overcomes the first two of these problems without sacrificing performance in any area and proposes a new method to greatly improve the input power factor, although at the expense of possible input current subharmonics. A non-limiting application of the method to a 3 pulse, 3 phase, non-circulating current cycloconverter is described. The technique may also be applied to static power frequency changers other than the cycloconverter. In one broad form, there is provided in a static power frequency changer connecting one or more input phases to one or more outputs, said changer comprising one or more electronic switching means comprising a plurality of electronic switches, modulation means to sequentially activate individual switches of said electronic switching means, said electronic switching means connecting an AC voltage supply comprising one or more input phases to an output, so that the output voltage waveform at said output is built up of sections of the input voltage waveforms on said one or more input phases; a method of selecting, for each said output, an instant of switching of the input waveform to be connected to said output, wherein: for each output said instant of switching is chosen so that during a predetermined time interval the average of the difference between the continuous integral of the desired output voltage and an estimate of the continuous integral of the actual output voltage is minimized, said predetermined time interval including said instant of switching to another input waveform.

81 Claims, 11 Drawing Sheets

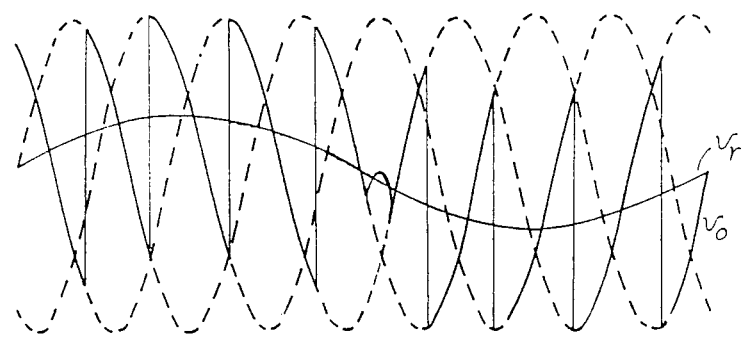
FIG. 7a
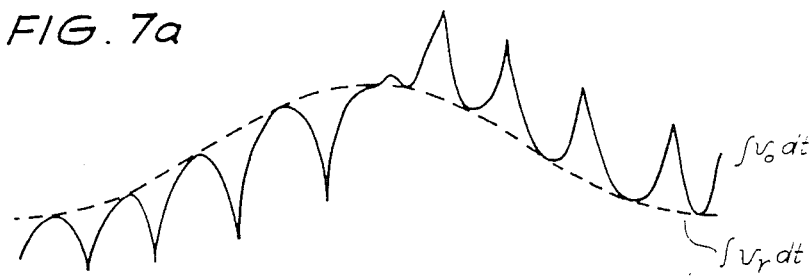
FIG. 7b
FIG. 8
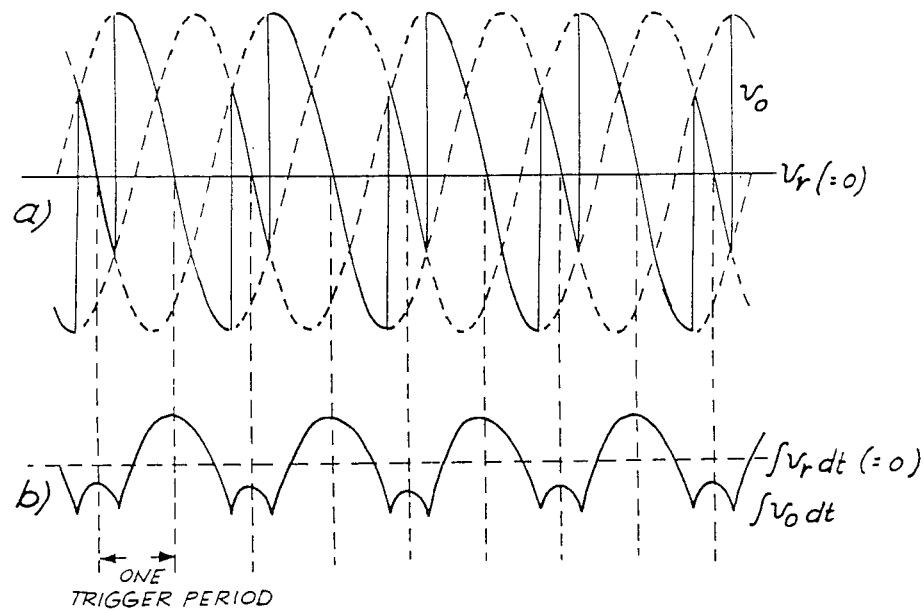

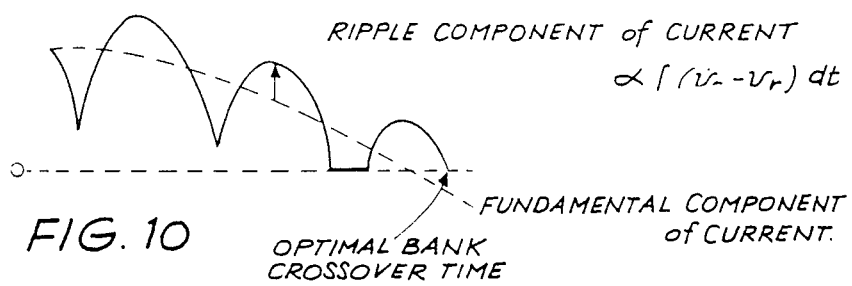
FIG. 10
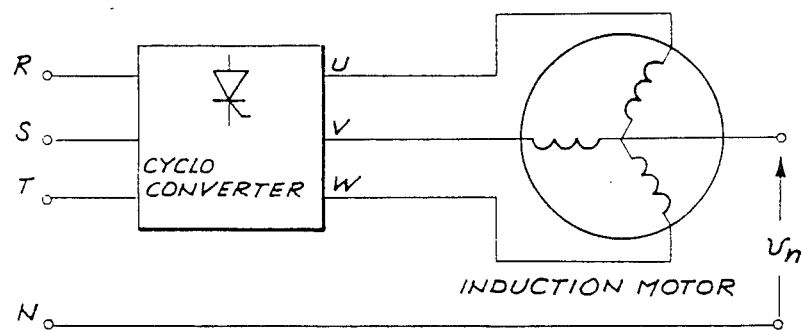
FIG. 11
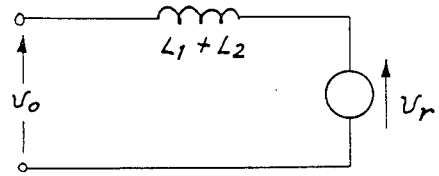
FIG. 9a
FIG. 9b
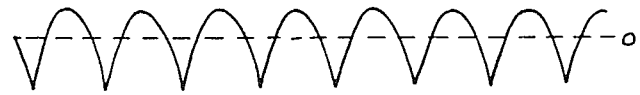

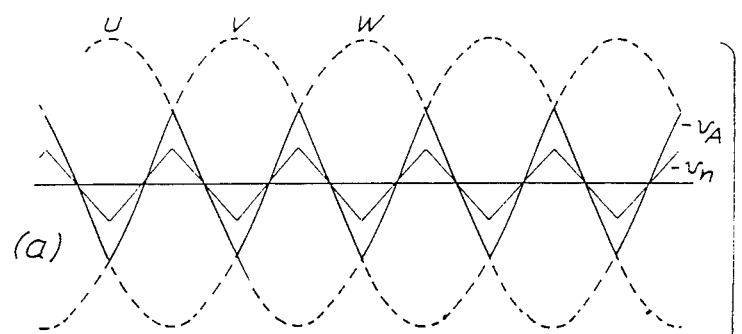
FIG. 12
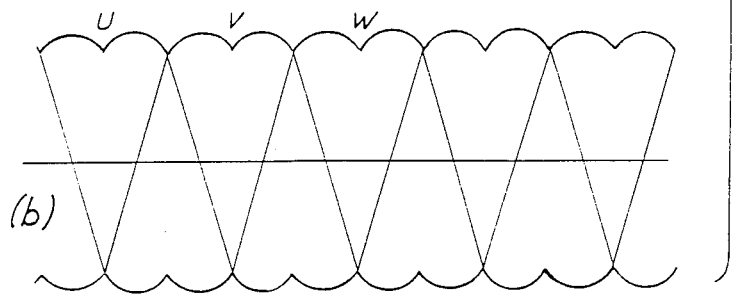
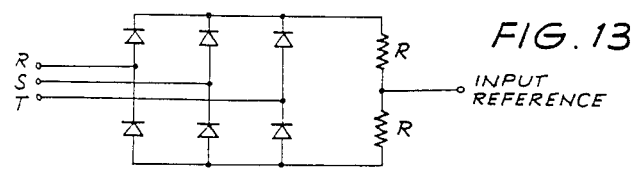
FIG. 13
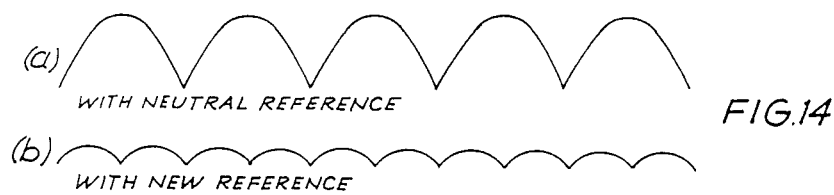
FIG. 14

MODULATION METHOD AND APPARATUS FOR STATIC POWER FREQUENCY CHANGERS

BACKGROUND OF THE INVENTION

The present invention relates principally to cycloconverters but also to other static power frequency changers, and, in particular, to specific methods of and apparatus for switching input waveforms from an AC supply of one or more input phases to achieve approximations to desired output waveforms.

NOMENCLATURE $f_i$ Input frequency.
$f_o$ Output frequency.
$t_1$ The starting time of a trigger period.
$t_2$ The ending time of a trigger period.
$t_0$ The time of occurrence of a particular phase angle of $V_t$ for a given trigger period.
$t_f$ The time the thyristor is triggered in a trigger period.
$t_c$ The time the current drops to zero (if this occurs) in a trigger period.
$v_o$ Output voltage on one phase of the cycloconverter.
$v_r$ Output reference voltage on one phase.
$v_b$ Boost voltage in one phase applied to overcome IZ voltage drop.
$v_t$ The input voltage connected to the thyristor to be triggered in a trigger period.
$v_p$ The input voltage connected to the thyristor that is on at the start of a trigger period.
$\psi$ Reference value of flux linkage in one phase of the induction motor.
K A constant determining stability.
$L_1$ Per phase stator leakage inductance.
$L_2$ Per phase, stator referred, rotor leakage inductance.

PRIOR ART

A static frequency changer is essentially a device for synthesizing an approximation to a desired output waveform by means of switching one portion of one or more input waveforms consecutively to the output of the device. The input waveforms used are either the input phase voltage waveforms or the inversion of these or both. The number of input waveforms used is called the pulse number of the frequency changer, so called because this is usually (although not necessarily) the average number of portions of the input waveforms switched to the output over one input cycle. The desired output waveform will typically have a frequency of less than half that of any input waveform. Switching of the input waveform is typically done at the input waveform frequency.

Cycloconverters can be defined as static frequency changers which use thyristors that are naturally commutated. Cycloconverters may be either of the circulating current type or the non-circulating current type. All other types of static frequency changers presently use switches that either have the intrinsic ability to turn off or use thyristors which are turned off with forced commutation.

Known input waveform switching strategies include "cosine crossing control" and "integral control".

Cosine crossing control uses a switching criteria based upon the intersection of selected portions of a phase shifted input waveform (typically 90°) and the desired output reference waveform. The integral method is based on the selection of input waveform triggering instants determined when the integral of the difference between the output voltage waveform and the desired reference voltage waveform (determined in real time) is equal to zero. The limitations of both these methods as applied to the cycloconverter are discussed in U.S. Pat. No. 3,585,485 to Gyugyi, Rosa and Pelly. In U.S. Pat. No. 3,585,485 a particular solution to an inherent problem in applying the integral method to approximate a non DC output waveform is disclosed. The solution involves injecting an offset component into the next integral calculation, the offset component being proportional to the DC component of the calculated ripple integrals of the integral method. U.S. Pat. No. 3,585,485 is concerned with the application of the integral method to a circulating current type cycloconverter. U.S. Pat. No. 3,585,486 is a concurrent patent to the same inventors concerned with applying the integral method to the non-circulating current cycloconverter.

PROBLEMS SOUGHT TO BE OVERCOME AND ADVANTAGES OF PREFERRED EMBODIMENTS

The method of the present invention has particular applicability to but is not solely limited to non-circulating current cycloconverters.

The non-circulating current cycloconverter has many advantages over other forms of A.C. variable speed drives: its maximum power output is virtually unlimited; its power circuit is very simple, consisting of only phase-controlled thyristors and their associated snubbers; it is very efficient; and it is naturally regenerative. With the present modulation methods in use, however, (cosine crossing control/integral control-with or without feedback) it suffers from some severe disadvantages. It has a low maximum output frequency (of about 25 Hz for a 6-pulse system) due to subharmonics appearing on the output. It suffers from voltage distortion and the associated torque pulsations due to the uncertainty of the current cross-over points and the inability of the prior art modulation methods to compensate for discontinuous currents in the thyristors. Also, it has a poor input power factor, particularly at low output voltages.

The performance can be improved by adding an extra current feedback loop around the cycloconverter and its modulator (refer for example to H Akagi et al "Application of microcomputer to current controlled cycloconverter system: in Electrical Engineering in Japan Vol. 100, No. 4, 1980, PP86–94). Using this approach, the improvement is limited by stability considerations, and the cycloconverter then becomes a current controlled device, rather than the more ideal voltage controlled device. Current control is particularly a problem with multi-motor drives.

It is postulated herein and is considered advantageous to solve the performance problems by improving the basic modulation method, rather than by attempting to linearize the present methods with current feedback.

The proposed modulation method of the present invention is an attempt to improve the basic modulation method. With the proposed improved method, subharmonics are virtually, if not entirely, eliminated; the occurrence of discontinuous current actually reduces the output voltage distortion, rather than increasing it; and cross-over between thyristor banks always occurs at the optimum time. The maximum output frequency using the new method is at least 25 Hz for a 3-pulse cycloconverter (refer Section 3.4) and is expected to be 50 Hz for a 6-pulse cycloconverter.

The proposed improved modulation method is generally referred to herein as double integration control.

Double integration control is particularly attractive when used with a 3-pulse cycloconverter in an induction motor drive. The power circuit consists of only 18 thyristors (refer FIG. 2) and has the same efficiency and size as the equivalent converter for a D.C. motor drive. In Example 1 of a preferred embodiment, the performance is at least as good as the equivalent 12 thyristor, 4-quadrant D.C. motor drive, with the advantage of using the more rugged induction motor.

The price paid for the improved performance of the improved modulation method is a more complex control circuit. The double integration control method is considerably more complex than the present methods based on cosine-wave crossing control. Microprocessor or equivalent dedicated implementation is considered essential. Example 1 of a preferred embodiment herein disclosed uses the extremely fast (200 ns instruction time) 16 bit TMS32010 microprocessor from Texas Instruments. A slower microprocessor could be used, but at the sacrifice of response time (at present 7 ms for the 3-pulse system) and with an increase in current ripple.

At present, fully regenerative A.C. drives use either a P.W.M. inverter with a fully controlled four quadrant bridge on the input or the simpler, but lower performance, current source inverter. The cycloconverter, with its high efficiency, simple power circuit, and high performance has the potential if suitably driven to become the first choice in this application and in most four quadrant d.c. drive applications. Disclosed herein is a method and apparatus for overcoming present problems with cycloconverters, particularly (although not exclusively) the 18 thyristor, 3-pulse non-circulating current cycloconverter, that allow this potential to be achieved. However, the invention is not to be construed as limited solely to such applications. The method is useful with other forms of static power frequency changers whenever an improved voltage waveform leading to an improved current waveform is desired usually dictated by the nature of the load.

Power Factor Improvement

The improved modulation method does not improve the input power factor, but described herein is a way of improving the input power factor which works well within the modulation method of the present invention. The power factor improvement method, however, may cause subharmonic components of the input current to appear, particularly in the case of a three pulse cycloconverter. The power factor improvement method disclosed herein can be utilized with any modulation scheme.

Pre-Integration Control

An alternative switching criteria which attempts to overcome the problems of the two previously discussed methods (cosine crossing and integral) is termed herein "pre-integration" control. Pre-integration control involves a selection of switching instants on the basis of the equality of calculated areas enclosed between the desired and actual output waveforms. Pre-integration control differs from integral control in that part of the area required for determination of switching instants is not available in real time as it is in advance of the switching instant and must be pre-calculated on the basis of an estimate of output waveform behaviour. Use of pre-calculation introduces inherent stability to this modulation method.

The pre-integration control method has advantages over the prior art. Its performance characteristics include:
1. It is stable (because of pre-calculation) as compared to the integral control method:
2. Relative to the cosine control method:
   (a) Pre-integration control compensates for discontinuous current,
   (b) it virtually if not entirely eliminates sub-harmonic components of the output voltage (where sub-harmonic components are defined as frequency components less than the desired output frequency),
   (c) an induction motor can be unstable when controlled by the cosine crossing method because discontinuous current is not compensated for.
3. Concerning bank cross over techniques the pre-integral method ensures minimum voltage distortion during cross over between banks.
4. The cosine crossing control method with feed back is only partially effective in reducing sub-harmonics. It is certainly much less effective than the pre-integral control method in this respect. Furthermore, with cosine crossing control with feedback, at high frequencies the feedback has to be reduced so that the method effectively reverts to ordinary cosine crossing control with its inherent sub-harmonic problems at high frequency.

Problems with Pre-Integration Control Method

FIG. 7(a) shows the output waveform, $v_o$, that would be obtained from the reference waveform, $v_r$, using pre-integration control. It is assumed for simplicity that the output current is in phase with the output voltage and does not become discontinuous. FIG. 7(b) shows the integral of $v_r$ and the integral of $v_o$. It can be seen that the average of the integral of the output waveform is badly distorted with the pre-integration control method. In an induction motor, this would cause a corresponding distortion in the flux waveform which would degrade the performance of the motor.

Double Integration Control

The double integral modulation method of the present invention retains the advantages of pre-integration control, viz elimination of subharmonics and compensation for discontinuous current.

Bank Switching

For the naturally commutated cycloconverter the method of switching between banks is also important in order to obtain satisfactory outputs therefrom.

To complement the improve modulation method of the present invention, disclosed herein are improved methods of determining optimum bank crossover time.

Prior art methods have heretofore produced undesirable voltage distortion of the output waveform due to poor selection of the bank crossover time.

The most commonly applied prior art method adopts a bank crossover selection criterion based on crossover at the instant when the output current first goes to zero during bank operation.

BRIEF DESCRIPTION OF THE INVENTION

The basis of the double integration method of the present invention derives from the expression:

$$\theta = \int_{t_1}^{t_2} \int_{\theta}^{t} (v_o - v_r) dt^2 \tag{1}$$

as applied to the modulation of static power frequency changers.

In one broad form, the static power frequency changer of the invention includes a plurality of electronic switches connecting an AC voltage supply having one or more input phases to one or more outputs. A modulator sequentially activates individual electronic switches so that the output voltage waveform at each output is built up of sections of the input voltage waveforms on one or more of the input phases. A method of selecting, for each output, an instant of switching of the input waveform to be connected to that output is provided, wherein for each output the instant of switching is chosen so that during a predetermined time interval the average of the difference between the continuous integral of the desired output voltage and an estimate of the continuous integral of actual output voltage is minimized. The predetermined time interval includes the instant of switching to another input waveform.

In a further broad form of the invention, a method of bank switching in a cycloconverter is provided. The cycloconverter includes a plurality of naturally commutated thyristor divided into positive and negative banks, wherein only one bank is operating at any one time. The method of choosing the time of switching the thyristors includes a method of adjusting the time of switching of the thyristors to take account of discontinuous current. The method of bank switching comprises changing to an alternate bank when the time of switching is delayed to or past a waveform intersection time. The wave intersection time is defined as the time of intersection of the desired output waveform with the input waveform to be switched to the output at the time of switching.

In yet a broader form, the invention provides a method of bank switching in a cycloconverter having naturally commutated thyristors divided into positive and negative current switching banks, wherein only one bank is operating at any one time. The method includes selecting the instant of crossover from the positive bank to the negative bank so that it occurs at the first instant that the output current is zero and, at the same time, the integral of the difference between the output voltage and a reference voltage is positive. The method further includes selecting the instant of switching from the negative bank to the positive bank at the first instant when the output current is zero and, at the same time, the integral of the difference between the output voltage and the reference voltage is negative.

BRIEF DESCRIPTION OF DRAWINGS

Embodiments of the present invention will now be described with reference to the drawings in which:

FIG. 7A depicts output and reference voltages ($v_o$ and $v_r$ respectively) shown with input voltages. FIG. 7B depicts the integrals of $V_o$ and $V_r$ from FIG. 7A showing the distortion produced with pre-integration control.

FIGS. 8A and 8B graphically provide an illustration of instability arising from unstabilised double integration control. FIG. 8A depicts output and reference waveforms $v_o$ and $v_r$ respectively with input waveforms. FIG. 8B depicts the integral of $v_o$ and $v_r$ (for the case where the integral of $v_r$ is equal to 0).

FIG. 9A depicts a simple per phase equivalent circuit for ripple current determination.

FIG. 9B depicts a typical waveform for the integral of the difference between the $v_o$ and $v_r$. (This corresponds to the ripple current waveform).

FIG. 10 graphically depicts optimum bank cross over time,

FIG. 11 is a power circuit schematic of a basic three pulse cycloconverter with motor load, FIGS. 12A and 12B graphically depict the derivation of new output voltage reference waveforms by adjustment of neutral voltage reference.

FIG. 12A depicts output voltage reference waveforms and neutral voltage waveform $V_n$ with output neutral as reference. $V_n$ is chosen to be $\frac{1}{2}V_a$.

FIG. 12B depicts output voltage reference waveforms with $V_n$ added.

FIG. 13 depicts a power circuit suitable to create an input reference (used in example 1), FIGS. 14A and 14B, disclose typical output voltage ripple waveforms at maximum positive voltage level for two possible choices of input reference, (both diagrams are to the same scale). FIG. 14A shows ripple waveforms using a neutral reference. FIG. 14B depicts ripple waveforms using the reference of FIG. 13.

FIG. 17A depicts output reference waveforms with zero nuetral voltage. FIG. 17B depicts the modified output reference waveforms.

FIGS. 19A, B and C depict the voltage on each of the 3 output phases together with the reference voltage and the 3 input voltages.

FIG. 19D depicts the input current on the R phase together with the R phase input voltage and the 3 output currents. The input current waveform was derived graphically from the other waveforms.

1. DETAILED DESCRIPTION OF PREFERRED EMBODIMENTS

For the purpose of the description, it is assumed that the positive current thyristor bank is operating. For the negative current thyristor bank, the method is identical except the direction of the voltages and currents is reversed.

1.1 "Pre-integration control"

Described here initially is a modulation method termed pre-integration control. This modulation method can be used to advantage in A.C. to D.C. thyristor converter control.

Figure 4:
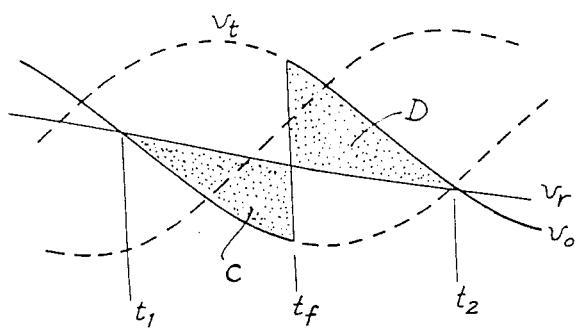

The pre-integration control method is illustrated in FIG. 4. Shown are the input voltage waveforms, the wanted fundamental output voltage, $v_r$, and the trigger instant, $t_f$, of the thyristor. In this control scheme, the thyristor should be triggered between the instances when the reference waveform intersects the input waveforms fed to the incoming and outgoing thyristors. These two instances are the ideal start and end times of the period, called the trigger period, over which the calculations for pre-integration control are carried out, although other choices of the trigger period can be used. In FIG. 4, the trigger period chosen is the time from $t_1$ to $t_2$. The time $t_f$ when the thyristor is triggered occurs when area C is equal to area D. Here, area D cannot be measured directly because it occurs after the thyristor is triggered. It must be pre-calculated. Expressed mathematically, $t_f$ is chosen so that:

$$\theta = \int_{t_1}^{t_2} (v_o - v_r)dt \quad (2)$$

This scheme aims to keep the integral of an estimate of the output voltage from $t_1$ to $t_2$ equal to the integral of the reference voltage over the same time and thus attempts to keep the average of the two waveforms over this interval the same. An advantage of this method for driving an induction motor is that if the motor flux is at the correct value at time $t_1$, then it will also be at the correct value at time $t_2$ and at the end of every subsequent trigger period. Also, because the integrals of the reference and output waveforms are equal to each other at the end of each trigger period, there can be no long term build up in errors causing subharmonics. (Error build-up is a particular problem with the prior art cosine-crossing method).

1.2 Compensating for Discontinuous Current—A Practical Implementation of Pre-Integration Control The negative voltage excursions below $v_r$ that occur before the trigger instant, $t_f$, when the output phase current is positive can bring this current to zero for a short time (i.e. make the current discontinuous). A similar situation can occur for a negative phase current due to positive voltage excursions above $v_r$. During this time of zero current, the phase voltage, $v_o$, on the motor terminal depends on the voltages of the other two phases and is largely indeterminate.

Figure 5:
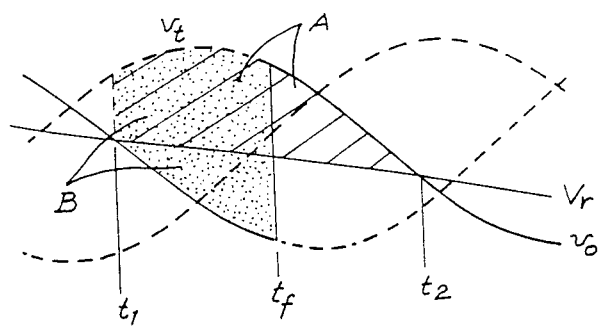

An improved calculation method which results in the same triggering time as the above method, but is more practical when the voltage distortion caused by discontinuous current is to be compensated for is illustrated in FIG. 5. Area A in this figure is first pre-calculated. This is given by the formula:

$$A = \int_{t_1}^{t_2} (v_t - v_r)dt \quad (3)$$

Next, the voltage difference $v_t - v_o$ is integrated in real time from time $t_1$. When this integral reaches the value of area A (which was pre-calculated), the thyristor is triggered. The algorithm is really the expansion of equation (2) to the following:

$$\theta = \int_{t_1}^{t_2} (v_t - v_r)dt - \int_{t_1}^{t_f} (v_t - v_o)dt \quad (4)$$

The first term is pre-calculated at the start of the trigger period. The other term is calculated repeatedly from the start of the period with $t_f$ replaced by the current time, t. When the second term reaches the value of the first term, the thyristor is triggered.

Figure 6:
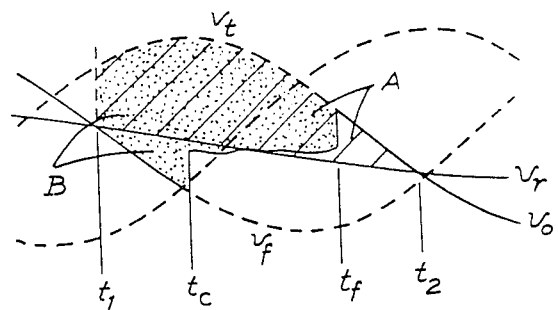

The effect of this method on discontinuous current is shown in FIG. 6. At time $t_c$, the current drops to zero and the thyristor that was previously on turns off. With no connection between the input and output of the cycloconverter, $v_o$ is now indeterminate. The current remains zero until time $t_f$ when the next thyristor triggers, re-establishing a positive current flow. As can be seen from FIG. 6, if the thyristor is triggered by the previously described method, i.e. when area B is equal to area A, the integral from $t_1$ to $t_2$ of $v_o - v_r$ is again zero and thus the effects of the discontinuous current are compensated for.

1.3 Description of Double Integration Control Method

It can be seen from FIG. 7 that with pre-integration control the average of $v_o$ is maintained at the average of $v_r$ over one trigger period, but this is not the case for the integrals of these two waveforms. To maintain correct flux in an induction motor, keeping the average of the two integrals equal is the main requirement. Expressed mathematically, this is achieved when $t_f$ in a trigger period is chosen so that:

$$\theta = \int_{t_1}^{t_2} \int_{\theta}^{t} (v_o - v_r)dt^2 \quad (5)$$

This is the basis of double pre-integration control.

The value of $t_f$ which solves this equation depends on the initial value of the integral of $(v_o - v_r)$ at the start of the period. This leads to problems in implementation in a practical situation (refer also to U.S. Pat. No. 3,585,485 where similar problems were encountered with the integral modulation method). Unsymmetrical triggering, as shown in FIG. 8 can develop. This can be thought of as a form of system instability. The instability shows itself as an oscillation in the value of the integral of $v_o - v_r$ at the end of each trigger period.

To stabilise this modulation method, one technique is to make use of the observation from FIG. 8(b) that the difference between the integral of $V_o - V_r$ at the end of consecutive periods oscillates when the system is unstable. Other techniques can be used. When the system is unstable, the trigger time of the thyristor can be adjusted to reduce this difference, and thus reduce the instability, at the expense of letting the value of the RHS of equation 5 change from its ideal value of zero. A practical way of achieving this is to change equation 5 by adding a suitable proportion of this difference to it so that the value of the expression in equation 5 is forced to change in such a way as to suppress the instability. Equation 5 with this incorporated becomes:

$$\theta = \int_{t_1}^{t_2} \int_{\theta}^{t} (v_o - v_r) dt^2 + K(t_2 - t_1) \int_{t_1}^{t_2} (v_o - v_r) dt \quad (6)$$

This is the technique used in example 1.

Note that the constant, K, has been multiplied by the term $(t_2 - t_1)$ to make it dimensionless. To determine the optimum value of the constant, a rough computer simulation of the modulation method, which assumes the input waveforms are trapezoidal rather than sinusoidal (this is closer to the actual waveforms in example 1) was carried out [Appendix I]. It was found that an optimum value of K, which corresponds to critical damping, is 0.5. The simulation also showed that with this value of K, recovery from a disturbance is very fast. If a disturbance occurs at the start of a trigger period, then the integral of $v_o - v_r$ reaches 96% of its steady state value by the end of the period. It is hoped to derive the optimum value of K mathematically at a later time in order to find out whether it is waveform dependent.

In order to determine a practical algorithm to implement this modulation method, and to have automatic compensation for discontinuous current, equation (6) must be expanded into a similar form to equation (4), with no integrations starting from $t_f$. There are many expansions that fulfill these criteria. One that is particularly suitable to the microprocessor used in example 1 is:

$$\theta = \quad (7)$$

$$\left\{ \int_{t_\theta}^{t_2} \int_{t_\theta}^{t} v_r dt^2 - \int_{t_1}^{t_2} \int_{\theta}^{t} v_r dt^2 \right.$$

$$\left. + K(t_2 - t_1) \int_{t_\theta}^{t_2} v_r dt - K(t_2 - t_1) \int_{t_1}^{t_2} v_r dt \right\} (a)$$

$$- K(t_2 - t_1) \int_{\theta}^{t_1} v_o dt \quad \Big\}(b)$$

-continued $$+ \int_{t_1}^{t_f} \int_{\theta}^{t} v_o dt^2 \quad \Big\}(c)$$

$$\left\{ - \int_{t_\theta}^{t_f} \int_{t_\theta}^{t} v_r dt^2 + (t_2 - t_f) \int_{\theta}^{t_f} v_o dt + \right.$$

$$K(t_2 - t_1) \int_{\theta}^{t_f} v_o dt$$

$$\left. - (t_2 - t_f) \int_{t_\theta}^{t_f} v_r dt - K(t_2 - t_1) \int_{t_\theta}^{t_f} v_r dt \right\}(d)$$

The time $t_0$ is a time chosen so that it always corresponds to a particular phase angle of $v_t$. In example 1 it is also chosen to be before the start of the trigger period, but this is not essential. This is introduced to enable calculations involving $v_t$ to be done using fast look-up tables. In this algorithm, the output voltage is not required, but only its integral. This eases transducer requirements, as the integral can be obtained in digital form directly via an integrating type v/f converter, an isolating pulse transformer and a counter. It is not recommended that the integration of the output voltage be done in software, as the accumulation of round-off errors could result in subharmonics occurring on the output. In operation, the terms involving $t_f$ are calculated repeatedly from the start of the trigger period with $t_f$ replaced by the current time, and then added to the other pre-calculated terms. When the total goes through zero, the thyristor is triggered.

Section (a) of the equation 7 can be calculated any time up to, and perhaps just after, the start of the trigger period. In the prototype it is calculated just after the start to minimise the system response time. Section (b) is found by reading the integral at the start of the trigger period then doing the multiplications, and so cannot be done until after the start of the trigger period. The remaining sections contain the variable $t_f$, and so must be calculated repeatedly as described above. Section (c) is calculated numerically by successively reading the value of the integral of $v_o$ and adding it to an accumulator.

1.4 Control of Flux and Voltage Boost

In a real motor, the motor flux is not the integral of the applied voltage as assumed so far, but is the integral of the applied voltage less the voltage drop across the motor leakage reactance and the stator resistance. If we split the reference voltage, $v_r$, into a boost voltage component, $v_b$, to compensate for this voltage drop, and a component due to a new reference $\psi(t)$, representing the motor flux at time t, then the integral of $v_r$ can be expanded to:

$$\int_{\theta}^{t} v_r dt = \psi(t) + \int_{\theta}^{t} v_b dt \quad (8)$$

Using this expansion, equation (7) now becomes:

$$\theta = \int_{t_\theta}^{t_2} \int_{t_\theta}^{t} v_r dt^2 \cdot \int_{t_1}^{t_2} \psi(t) dt - \int_{t_1}^{t_2} \int_{\theta}^{t} v_b dt^2 + \quad (9)$$

-continued $$K(t_2 - t_1) \int_{t_\theta}^{t_2} v_t dt -$$

$$K(t_2 - t_2)(\psi(t_2) \cdot \psi(t_1)) - K(t_2 - t_1) \int_{t_1}^{t_2} v_b dt -$$

$$K(t_2 - t_1) \int_\theta^{t_1} v_o dt + \int_{t_1}^{t_f} \int_\theta^{t} v_o dt^2 -$$

$$\int_{t_\theta}^{t_f} \int_{t_\theta}^{t} v_t dt^2 + (t_2 - t_f) \int_\theta^{t_f} v_o dt + K(t_2 - t_1) \int_\theta^{t_f} v_o dt -$$

$$(t_2 - t_f) \int_{t_\theta}^{t_f} v_t dt - K(t_2 - t_1) \int_{t_\theta}^{t_f} v_t dt$$

For normal motor control without field weakening, the flux waveform should be kept constant, so $\psi(t)$ in equation (9) can be found from a look-up table. The amplitude and phase of the boost voltage, $v_b$, can be fixed for simple control schemes, or can be varied rapidly as the fundamental component of the motor current changes in response to changes in load.

1.5 Effect on Ripple Current

The current ripple in each phase of the motor consists of high frequency components only. Because of this, only the leakage inductance of the motor need be considered when determining its value. A per phase motor equivalent circuit that is adequate for determining the current ripple waveform is shown in FIG. 9(a). Voltage $v_r$ is the reference voltage of the corresponding phase of the cycloconverter and is equal to the fundamental component of the back e.m.f. plus the drop across the stator resistance and the total leakage inductance. Using this equivalent circuit, the ripple current is given by:

$$\text{Ripple current} = \frac{1}{L_1 + L_2} \int (v_o - v_r) dt \quad (10)$$

A typical ripple current waveform for a positive current from the cycloconverter is shown in FIG. 9(b).

Comparing expression (10) to equations (5) and (6), it can be seen that the double pre-integration control method keeps the integral of the current ripple waveform as close as possible to zero during each triggering period. This should also keep the amplitude of the current ripple near its minimum value. This indicates that double integration control is also a very good modulation method for cycloconverters used in other applications, such as high frequency power system interties and synchronous motor drives.

1.6 A Simplified Implementation of Double Integration Control

The method of implementing double integration control described above is very accurate, but requires considerable computing power to implement. If the application is not very demanding, a simpler but much less accurate method, which will now be described, can be used.

With some manipulation, equation (5), the basic equation used to determine the trigger time in double integration control, can be expressed in the following form:

$$\int_0^{t_1} (v_o - v_r) dt + \frac{1}{t_2 - t_1} \int_{t_1}^{t_2} \int_{t_1}^{t} (v_o - v_r) dt^2 = 0 \quad (11)$$

In a stable system, i.e. no instability of the type illustrated in FIG. 8, the integral of $v_o - v_r$ at the start of a trigger period is the same as that at the end of the period (not quite true when $V_r$ is changing, but close enough for this simple implementation), i.e.

$$\int_0^{t_1} (v_o - v_r) dt = \int_0^{t_2} (v_o - v_r) dt \quad (12)$$

Using this relation in equation (11), we obtain the equation:

$$\int_0^{t_2} (v_o - v_r) dt = \frac{-1}{(t_2 - t_1)} \int_{t_1}^{t_2} \int_{t_1}^{t} (v_o - v_r) dt^2 \quad (13)$$

The right hand expression in this equation is really a measure of the ripple in the integral of $v_o$ over the period from $t_1$ to $t_2$. It is positive when the positive thyristor bank is operating and is negative when the negative thyristor bank is operating with a magnitude depending approximately on the average value of $v_r$ during the trigger period providing there is no discontinuous current.

This suggests a very simple implementation of double integration control in which the switching time of the thyristors in the trigger period is chosen to satisfy the following equation:

$$\int_0^{t_2} (v_o - v_r) dt = M \quad (14)$$

where M is a constant which is positive when the positive thyristor bank is operating and negative when the negative bank is operating and has a magnitude that is fixed to the expected average magnitude of the expression on the right hand side of equation (13). This is a very rough, but very simple implementation. Alternatively, M is varied according to the average value of $v_r$ during the period to obtain a more accurate approximation. It is also possible, although not straight forward, to adjust the magnitude of M to compensate for discontinuous current during the period. A very simple version of this method is to set M to zero.

As done in pre-integration control and the first described implementation of double integration control, a practical form of equation (14) can be found by using the voltage $v_t$ and ensuring no integrations start at time $t_f$. A form of equation (14) expanded in this way is:

$$\int_0^{t_1} (v_o - v_r) dt + \int_{t_1}^{t_2} (v_t - v_r) dt - \int_{t_1}^{t_f} (v_t - v_o) dt = M \quad (15)$$

The simplest version of the above method with M set to zero actually turns out to be similar to pre-integration control, but with an improvement called here "error". This improvement is described below:

From FIG. 6, it can be seen that correct operation of the pre-integration control method relies on firstly that $v_t$ remains undistorted during the trigger period and secondly that the commutation time of the thyristors is very short. Neither of these conditions may necessarily hold in a practical cycloconverter. This may result in the unwanted build-up of the integral of $v_o - v_r$ over several trigger periods.

This error can be corrected by the following addition to the control method: The voltage $v_o - v_r$ is fed to an integrator. The output of the integrator at time $t_2$ represents the error in the area between $v_o$ and $v_r$ at this time. If this error is added to the next pre-calculated area A in FIG. 5, it will automatically be corrected for in the next trigger period.

Incorporation of this error correction method has the added advantage of relaxing the accuracy required in the calculation of the area A. Errors introduced by inaccurate calculation will be corrected in the next trigger period.

With the error correction method incorporated, equations (2) and (4) become:

$$0 = \int_0^{t_2} (v_o - v_r)dt \qquad 16(a)$$

$$0 = \int_0^{t_1} (v_o - v_r)dt + \int_{t_1}^{t_2} (v_t - v_r)dt - \int_{t_1}^{t_f} (v_t - v_o)dt \qquad 16(b)$$

The above method is probably the most degenerate form of double pre-integration control. Note that it can never degenerate to integral control because continuous integration from time zero (usually the start-up time of the cycloconverter) of $v_o$ and $v_r$ is required, whereas in pre-integration control, these integrations are done from the start of each period.

1.7 Comparison of the Different Implementations of Double Integration Control Below is a description of the different methods of double integration control in terms of how each method approximates the average of the difference between the integral of the output voltage and the integral of the reference voltage to zero and how each method prevents instability. The differences between the methods are illustrated in FIG. 20.

Figure 20:
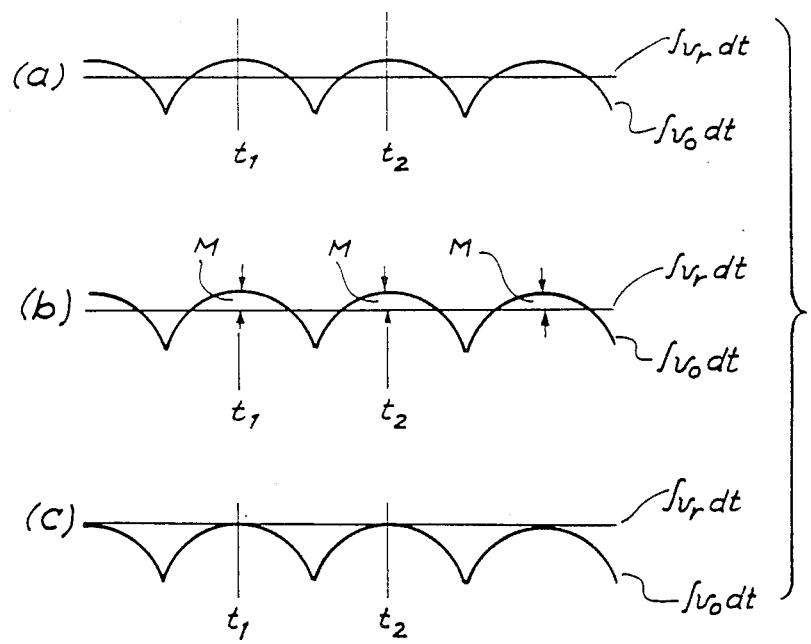
FIG. 20 depicts typical waveforms of the integrals of $v_o$ and $v_r$ for three different practical methods of implementing double integration control.

The first section of FIG. 20 shows typical output waveforms of the two integrals when using the method of equation 6. When there is no instability, this method keeps the averages of the two waveforms exactly equal (neglecting errors due to the hardware implementation). When the difference between the integral of $V_o - V_r$ at times $t_1$ and $t_2$ is not expected to be zero during the current period, indicating instability, this difference is reduced at the expense of letting the average of the two waveforms change from being equal. The compromise between these two requirements is determined by the weighting factor K in equation 6.

The second section of FIG. 20 shows typical output waveforms of the two integrals when using the method of equation 14. The average of the difference between these waveforms is controlled indirectly by controlling M. The value of M chosen at the start and end of each period is usually kept the same, forcing the difference between the integrals of $V_o - V_r$ at the start and end of the period (which are the values of M at the start and end of the period) to zero and thus preventing instability. When the value of M is changed, for instance when bank crossover occurs, the difference between the integrals of $V_o - V_r$ at the start and end of the period is not zero to allow the average of the two waveforms to come closer to zero in these situations.

The last section of FIG. 20 shows typical output waveforms of the two integrals when M is set to zero. How closely the average of the difference between the two waveforms approximates zero now depends on the amount of ripple in the integral of $V_o$. Stability is forced by always setting the difference between the integrals of $V_o - V_r$ at the start and end of each period to zero.

2. IMPROVEMENT TO VOLTAGE RANGE AND DISTORTION BEHAVIOUR

Using the modulation method of equation 6 allows the 3 pulse cycloconverter to efficiently and accurately control the speed of an induction motor. In the cycloconverter of Example 1 some further modifications were made to maximise its performance and these will be described below. With these modifications, the maximum output voltage before clipping is increased to 95% of the input voltage and the distortion when operating at or near maximum output voltage is improved. The modifications can be used with most modulation methods, including the improved and prior art modulation methods described herein.

2.1. Improvement of Output Voltage Range by Changing Output Neutral Voltage

The basic circuit of a cycloconverter with a 3 phase induction motor load (assumed here to be star connected) is shown in FIG. 11. Normally the neutral voltage, $v_n$, is kept as close to zero as possible, but in actual fact, $v_n$ can be any value without affecting the motor, provided the voltages between U, V and W are 3 phase sine waves. By choosing a suitable waveform for $v_n$, it is possible to reduce the peak voltage on the output of the cycloconverter for the same line to line voltage. The normal waveform chosen for $v_n$ is a sine wave of frequency 3 times the output frequency and an amplitude that will minimise the peak voltage on the outputs. This procedure is well known and has been documented many times, an example being Nakajima et al ["Reactive Power Reduced Cycloconverter with Bias Voltage at the Neutral Point"—IEEE—IAS Meeting—19-80—Pt 2, pp. 785-790].

The same method to improve the output voltage range is used here, but instead of a sine wave, the waveform is chosen to maximise the effect. FIG. 12(a) shows the waveform used for $v_n$ and how it is chosen and FIG. 12(b) shows the resulting output waveforms. With this modification, the peak line to line output voltage before clipping is 95% of the input voltage. With the normal method of choosing a sine wave for $v_n$, the peak line to line output voltage is also improved to 95% of the input voltage, but the output instantaneous voltage is at its peak level for a longer proportion of each cycle resulting in any clipping producing more severe output voltage distortion.

2.2 Improving Distortion by Changing Input Reference

So far it has been assumed that the measuring reference point used by the cycloconverter control circuits is the input neutral point. As there is no actual neutral supplied to the cycloconverter, this reference point would have to be obtained using a star network of resistors. In the prototype cycloconverter, an alternative reference point, obtained with the circuit of FIG. 13, is used. The voltage waveform at this new reference point with respect to the true input neutral point is the same as $v_n$ in FIG. 12(a) with a frequency of three times the mains frequency. With respect to this new reference point, the input waveforms are no longer sine waves, but are the same as the waveforms of FIG. 12(b).

The advantage of using the alternate reference is that when operating at maximum output voltage, the voltage distortion is reduced and the ripple frequency is doubled. This effect is shown in FIG. 14. An important side benefit to using the alternate reference is that the input waveforms can be approximated by trapezoidal waveforms. This considerably eases the calculations required in the microprocessor to determine the start and end times of a trigger period.

3. IMPLEMENTATION—EXAMPLE 1

3.1 Motor Requirements

In developing the modulation method of the present invention, the motor requirements when driven by a cycloconverter were looked at very carefully, particularly for the induction motor, as this is the preferred motor for most applications.

One way to get good performance out of an induction motor—cycloconverter drive is to make it simulate as close as possible a thyristor converter—D.C. motor drive, and this is the approach taken here. In a D.C. drive, the motor flux is kept constant by a constant field current, while the speed is controlled by a highly distorted D.C. voltage applied to the armature. The distortion in the armature voltage produces a high ripple current and a corresponding increase in motor heating, but has little effect on the motor performance. This is because the torque is proportional to the product of flux and current and so the ripple current produces only a corresponding high frequency ripple torque without affecting the average torque.

To simulate the conditions in a D.C. machine for an induction motor, the components of flux linkage in the three phases must be kept as close as possible to three sine waves of equal amplitude and displaced by 120 degrees, which means that the integrals of the three input voltages must be likewise kept. This is the criteria on which the new modulation method was developed. If the flux linkage components in each phase can be kept sinusoidal by the cycloconverter, then only the component of current of the same frequency can contribute to the D.C. component of torque. There would be a pulsating torque due to the ripple components of the currents, but this would be no worse than that of the equivalent D.C. machine containing $\frac{2}{3}$ the number of thyristors as the cycloconverter.

3.2 Hardware

Figure 15:
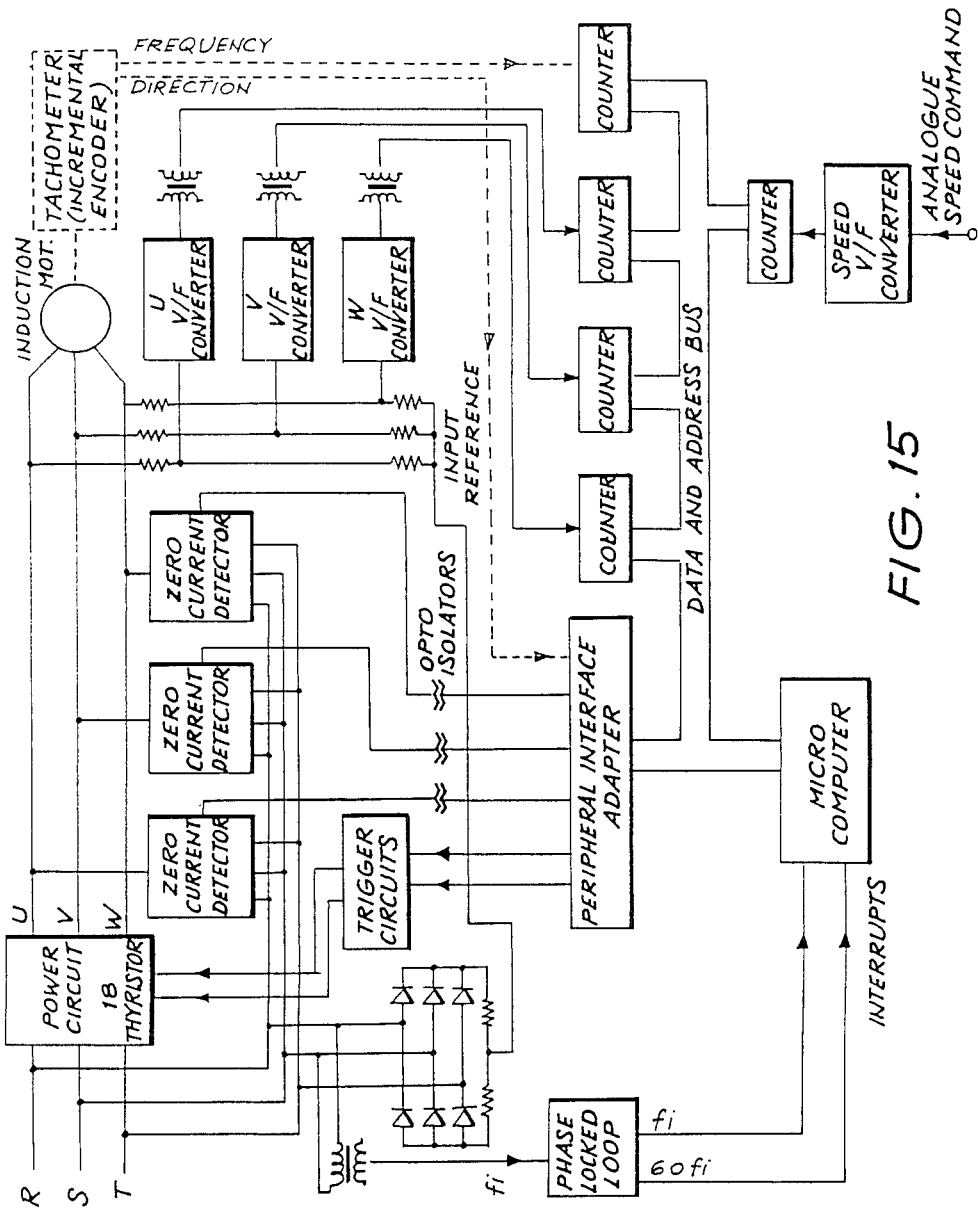
FIG. 15 is a block diagram of an example (Example 1) of a three input phase, three pulse, three output phase cycloconverter utilising preferred embodiments of the method(s) of the present invention, FIG. 16 graphically depicts an approximation waveform used for calculations relating to stability.

FIG. 15 is a block diagram of Example 1 using a three pulse cycloconverter with double integration control. The zero current detectors on each output phase work by sensing the voltage across each thyristor as described by Hamblin and Barton ["Cycloconverter Control Circuits"—IEEE Trans. Ind. App. 1972 Vol. IA-8—No. 4, p. 443–452]. To measure the integral of the output voltages, three voltage to frequency converters of the integrating type interfaced to the microprocessor via counters are used. An offset voltage (not shown in FIG. 15) is applied to the input of the voltage to frequency converters to enable them to operate in the bipolar mode. This is compensated for by the microprocessor software. The input analogue speed command is also measured by a voltage to frequency converter coupled to a counter. This has the advantage of being cheaper than an analogue to digital converter, allows the average speed over each speed sampling period to be measured rather than the speed at each sampling instant, and gives infinite speed resolution.

The microprocessor is timed by two interrupt signals supplied by a phase locked loop locked to the mains. One is at the same frequency as the mains and is used to synchronise the microprocessor to the mains. The other is at 60 times the mains frequency and determines the sampling instances.

For accurate control of voltage boost to enable accurate and fast motor response, the tachometer can be added as shown. In Example 1 no current feedback is used as the cycloconverter thyristors are fuse protected, and the motor current can be deduced from the slip (derived from the tacho feedback).

3.3 Microprocessor Requirements

The main limitation on the choice of microprocessor is processing speed. As can be seen from equation (7), a large number of calculations are required during each sampling interval, as well as other jobs such as checking for zero current. To reduce the load on the microprocessor, the sampling interval should be as long as possible, but a longer sampling interval produces extra voltage distortion because the thyristor firing time can be delayed by up to one sampling interval from the ideal time. It would be ideal if the sampling interval of $v_o$ that is introduced by delaying the firing time by one sampling interval is much less than the normal ouput distortion, which can be quantified as the normal peak value of the integral of $v_o - v_r$. The sampling interval chosen for the prototype is 333 microseconds which results in an error of about one quarter of the normal output distortion. This is greater than the ideal, but was limited by the speed of the microprocessor used.

The microprocessor chosen, the TMS32010, is one of the very few on the present market with enough processing speed without resorting to bit slice devices. It is designed for digital signal processing, but has an instruction set powerful enough for general control use.

3.4 Performance of Example 1

Drives using cycloconverters are known for their smoothness at low speeds. With the improved method of modulation, this is improved even further. The double integration control technique virtually, if not entirely, eliminates any possibility of subharmonics and prevents distortion being introduced by discontinuous currents.

The output frequency of Example 1 is capable of going up to at least 25 Hz and the output voltage is 95% of the input voltage. With a two pole induction motor, this allows a speed range from 0 to 1500 r.p.m. which is adequate for most applications. Note that a maximum output frequency of 50 Hz can be obtained from a 6-pulse cycloconverter using double pre-integration control, but at the expense of twice the number of thyristors in the power circuit. A standard mains voltage delta connected induction motor can be used for the 3-pulse cycloconverter by reconnecting it to star configuration. The line to line voltage required for 25 Hz operation would then be 86.6% of the mains voltage, which is a reasonable match to the cycloconverter. This is what was used for testing Example 1.

The motor used for testing was a 4 pole, 7.5 kW motor which was loaded to 2 kW at 25 Hz by a DC generator. No tachometer feedback was used and the voltage boost from the cycloconverter was fixed at a level that would give a maximum torque at low speed of one half full load torque. From 0.5 to 25 Hz, the highest frequency tested, the drive performance was excellent with no hint of instability or torque pulsations. Below 0.5 Hz, multiple switchings between the positive and negative banks occurred near each true current zero point, producing slight torque pulsations at these instances. The reason for this has yet to be investigated.

The response time of the cycloconverter with double pre-integration control depends on how the algorithms are implemented in the microprocessor. In a preferred embodiment, as explained in section 1.3, the first part of equation (7) for a given trigger period is calculated just after the start of that period. To do this calculation, the reference voltage waveform to the end of the period must be known. This problem is overcome in Example 1 by measuring the input variables, speed reference and tachometer output, or just the speed reference when there is no tacho feedback, every 120 degrees advance of input phase, but delaying the use of these readings until after the next 120 degrees advance. This gives an effective response time delay of about 7 milliseconds, which is as good as the best D.C. drives.

4. BANK CROSS OVER DETERMINATION

4.1 Bank Switching—First Method

A simple method of determining the time when bank cross-over should occur that can be used when the modulation method compensates for discontinuous current (e.g. pre-integration control and double pre-integration control) is as follows:

If, for example, in FIG. 6, the next thyristor is not switched on by the end of the trigger period at $t_2$, then it is not possible to maintain the average output at the reference voltage and this is the time when bank switching to the negative bank is carried out. To calculate the next triggering time after the bank cross-over, the time of bank cross-over can be made the starting time of but need not be the next trigger period. Note that this is a very different approach to that used in present modulation schemes which switch banks at an estimate of the zero crossibg of the fundamental component of output current. Instead the instant of bank switching is selected to minimise the output voltage distortion.

4.2 Bank Switching—Improved Method

The optimum bank cross-over time for the majority of Induction Motor applications is the first time the actual current is zero (and thus all thyristors in that phase are off) after the fundamental component of current passes through zero. Since the instantaneous value of the current ripple is proportional to the integral of $v_o - v_r$, which is a value which is available when the double pre-integration control method is used, it is quite easy to determine accurately this optimum bank cross-over time. As shown in FIG. 10, for a positive output current, the cross-over to the negative bank should occur at the first instant when the output current is zero and the integral of $v_o - v_r$ is positive (the integral should be negative for a negative output current). This is the first point when the current is zero and the fundamental component of the current is negative. To calculate the next triggering time after the bank cross-over, the time of bank cross-over for pre-integration and double pre-integration control can be made the starting time of but need not be the next trigger period.

This bank cross-over determination method is an improvement over the method described in section 4.1. Bank cross-over is initiated without waiting for the end of the trigger period in which the true current zero occurs.

When the cycloconverter has a 3 phase load with no neutral connection, as in the case with an induction motor load, an extra modification can be made to take account of the fact that any voltage distortion that is common to all three outputs does not produce any corresponding current ripple. The instantaneous value of the current ripple in a particular output is in this case proportional to the integral of $v_o - v_r$ less the instantaneous average value of the corresponding integrals on each of the three outputs. This is expressed in equation (17):

$$\text{Ripple Current} \alpha \int_0^t (v_o - v_r)dt - \frac{1}{3} \sum_{U,V,W} \int_0^t (v_o - v_r)dt \qquad (17)$$

To compensate for this, the cross-over from the positive to the negative bank should now occur at the first instant when the output current is zero and the expression on the right hand side of equation (17) is positive (and negative for a negative to positive bank cross-over). This is the scheme used in Example 1.

Note that this bank switching method can be used for pre-integration control and double integration control as well as for most other control methods (including the prior art methods disclosed herein).

5. POWER FACTOR IMPROVEMENT

Figure 1:
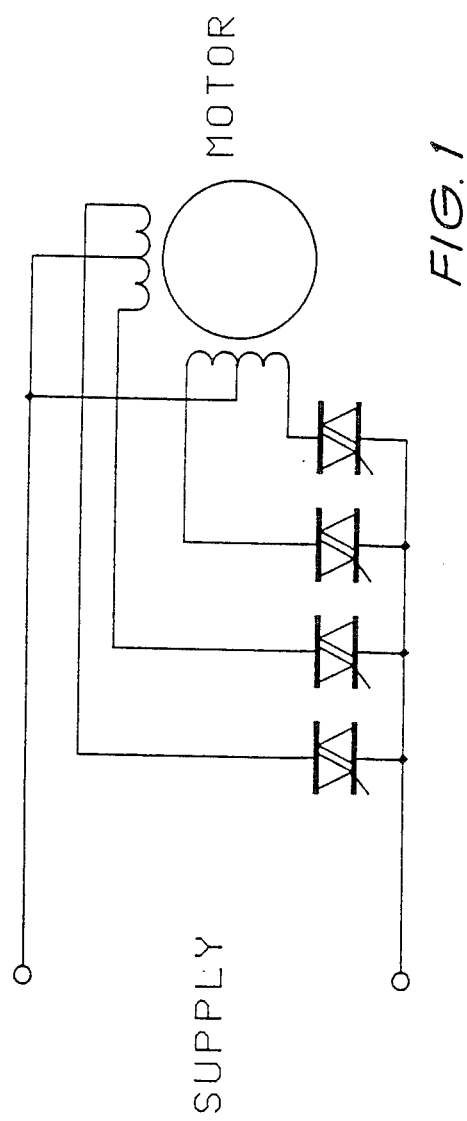
FIG. 1 is a schematic diagram of the power circuit of a single input phase, two pulse, two output phase cycloconverter, which uses triacs suitable to be driven by a preferred embodiment of the present invention, (the circuit being connected to a two phase, split winding induction motor)
Figure 2:
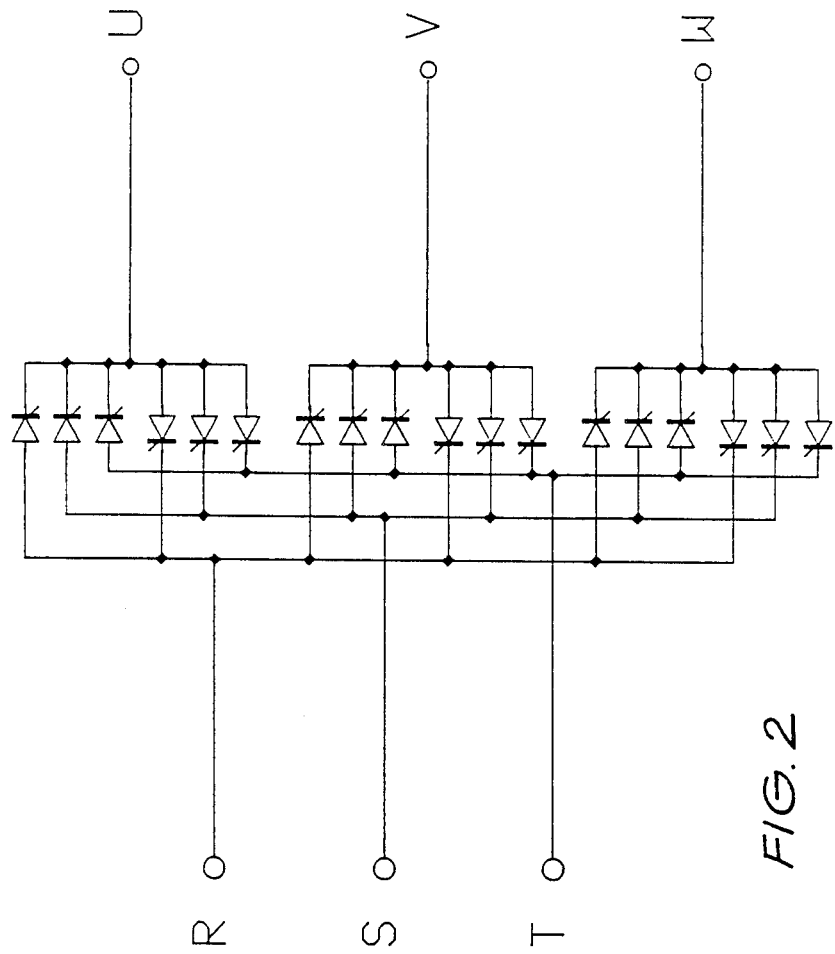
FIG. 2 is a schematic diagram of the power circuit of a three input phase, three pulse, three output phase cycloconverter, suitable to be driven by a preferred embodiment of the present invention.
Figure 3:
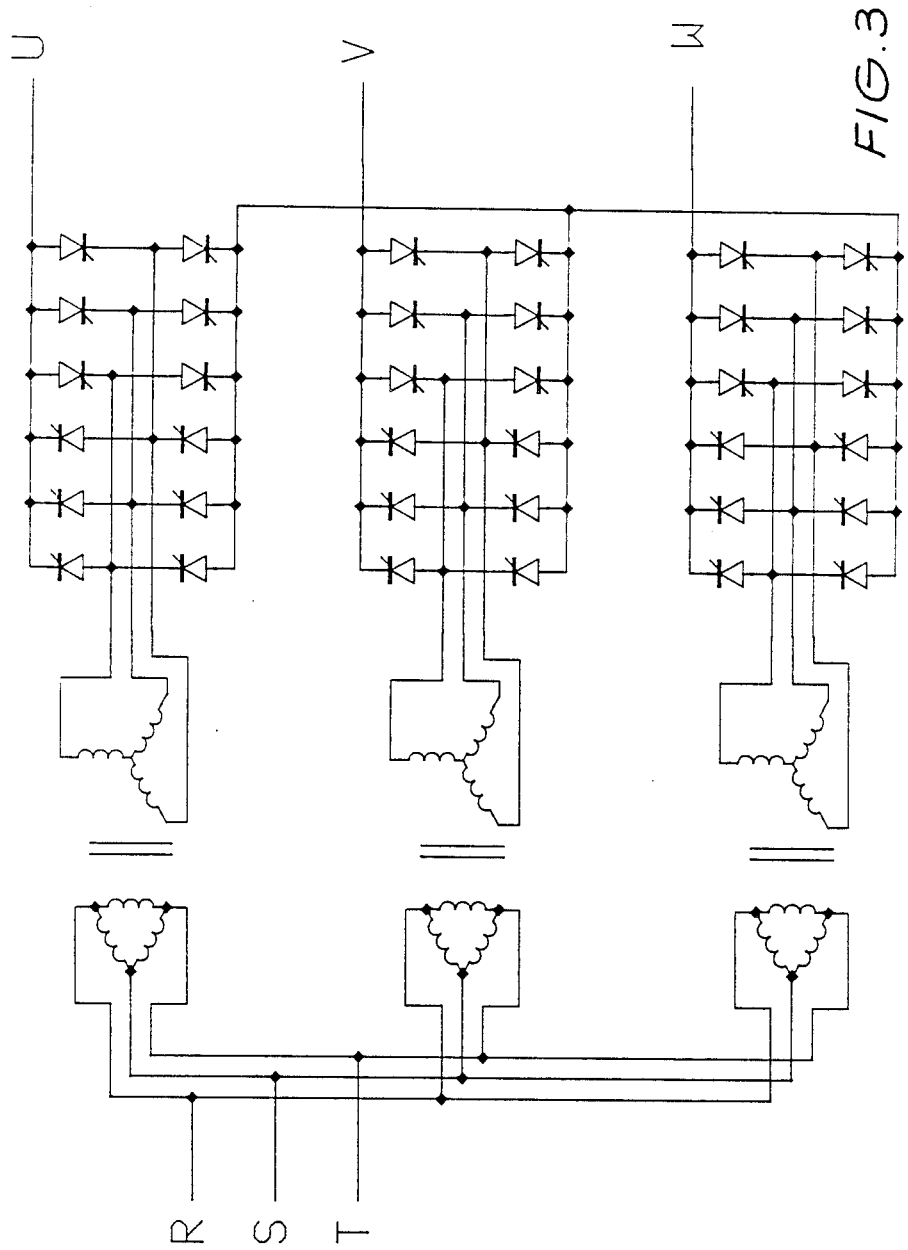
FIG. 3 is a schematic diagram of the power circuit of a three input phase, six pulse, three output phase cycloconverter, suitable to be driven by a preferred embodiment of the present invention, FIG. 4 graphically depicts one trigger period of the output of a cycloconverter using pre-integration control, FIG. 5 graphically depicts a practical method of implementing pre-integration control, FIG. 6 graphically depicts the effect of discontinuous current on the output of a cycloconverter using pre-integration control, FIGS. 7A and 7B graphically depict typical waveforms with pre-integration control (on the assumption that output current is sinusoidal and in phase with the output voltage).

Cycloconverters are well known for their poor input power factor, particularly at low output voltages. The power factor improvement method described here is well suited for use with double integration control, but can also be used with other modulation methods. The trade-off is that subharmonic components of the input current may appear. The following description of the method assumes the cycloconverter is a 3 pulse, 18 tyristor type (as shown in FIG. 2 for example).

5.1 Description

A basic circuit of a cycloconverter with a 3 phase induction motor load (assumed here to be star connected) is shown in FIG. 11. As explained previously, the neutral voltage, $v_n$, can be any value without affecting the motor, provided the voltages between U, V and W are 3 phase sine waves. The new power factor improvement method simply chooses $v_n$ to maximise the input power factor. This is similar to the technique used by Nakajima et al [previously referenced], but is much more effective.

Figure 17:
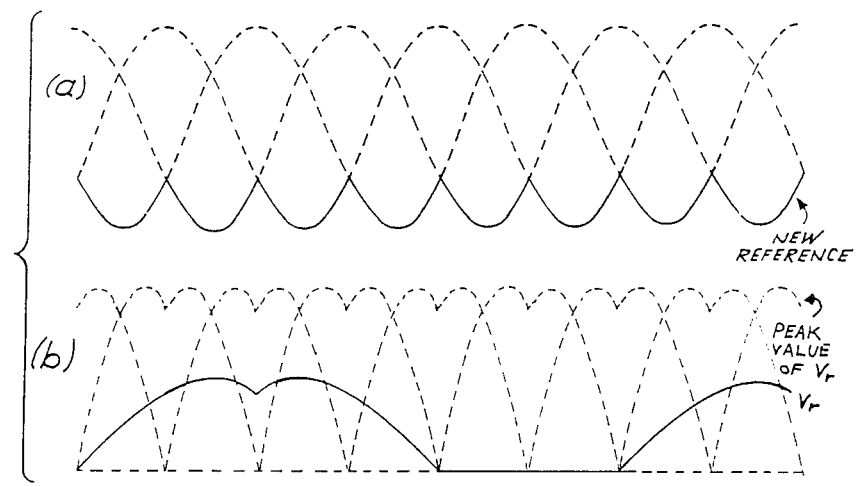
FIGS. 17A and 17B depict changes to output reference waveforms for power factor improvement.
Figure 18:
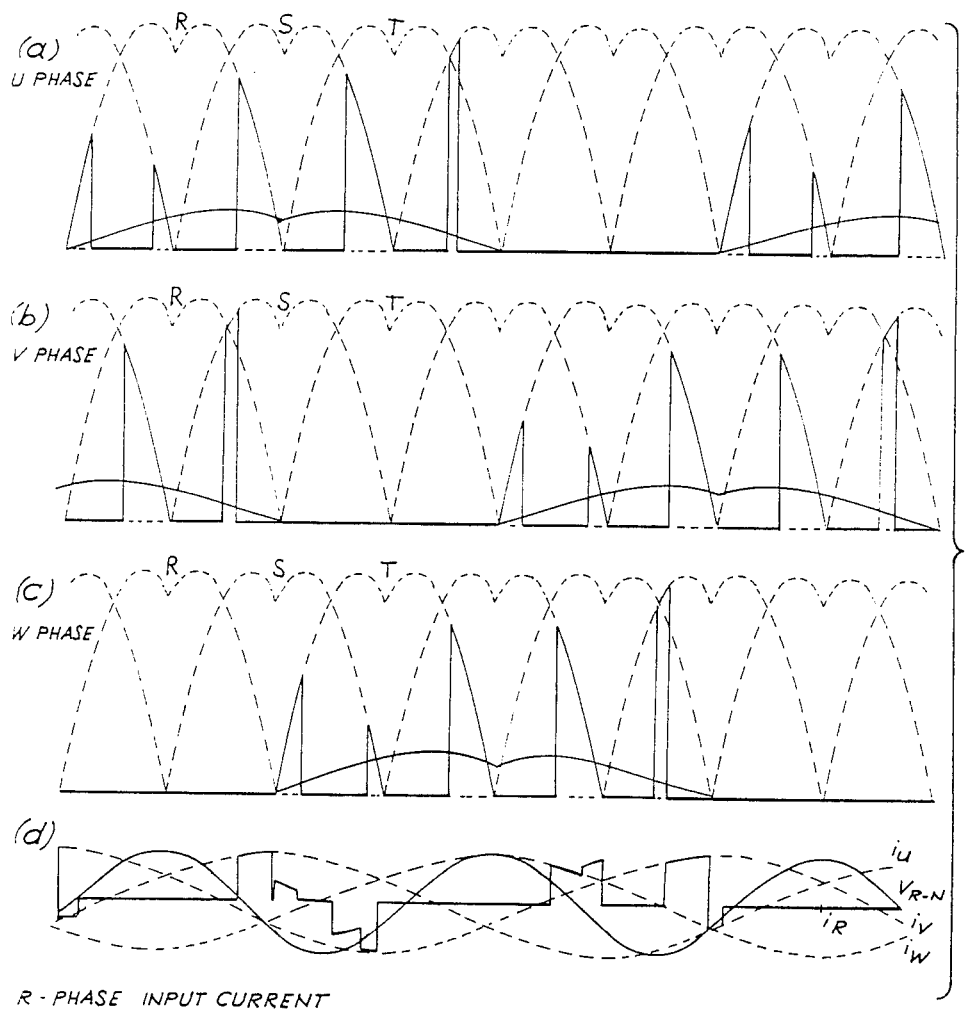
FIG. 18A depicts input waveforms showing the improved reference for power factor correction.
FIG. 18B depicts input waveforms drawn with respect to the improved reference of FIG. 18A with one phase of the output reference waveforms also shown.

To maximise the input power factor, the neutral voltage is changed as follows. The three phase voltages of a three phase sinusoidal waveform referenced to the neutral are shown in FIG. 17(a). If the reference is changed to the most negative voltage of FIG. 17(a) at any instant (which of course will not affect the line to line voltages in any way) the waveforms in FIG. 17(b) are obtained. This output reference can now be made equal to the most negative instantaneous input voltage, as shown in FIG. 18(a). The neutral voltage, $v_n$, will now be a combination of the two new reference waveforms in FIGS. 17(a) and 18(a). To make visual interpretation easier, this input reference is changed to a "straight line" reference in FIG. 18(b). Also in FIG. 18(b), the reference voltage, $v_r$, of one phase of a possible output waveform is superimposed on the input waveform in order to show the relation between the two.

5.2 Expected Improvements

Figure 19:
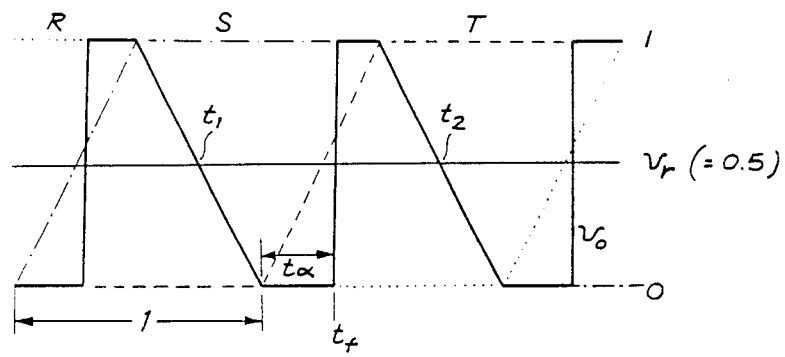
FIGS. 19A–D graphically depict typical waveforms for a three pulse cycloconverter using the power factor improvement method disclosed herein with an output amplitude 20% of maximum and an output frequency 50% of the input frequency.

To show the effect of change in $v_n$ on the input power factor, the three output waveforms and the input current waveform of one phase are shown in FIG. 19 for a very low output voltage, which is normally when the input power factor is the worst. Note that for simplicity, the thyristor commutation time is assumed to be zero. As can be seen in FIG. 19(d), the input current is zero for most of the time and is only equal to one or the addition of two of the output currents during relatively short intervals. When the input current is zero, the output currents are actually "free-wheeling" through the thyristors, rather than circulating around the input phases. As the amplitude of the output reference voltage reduces to zero, the intervals during which the input current is not zero, reducing also the r.m.s. value of the input current to zero. This can be compared to the normal method of keeping $v_n$ to a minimum, where there is no "free-wheeling" current and the r.m.s. values of the input and output currents are always approximately the same. Since the input power is always equal to the output power, the input power factor is improved by the same factor by which the r.m.s. input current has been reduced.

An improvement is also made in the output voltage distortion. When the output voltage is low, the sections of the input voltage waveforms that are applied to the output tend to be the low amplitude sections. With the normal method, the output is composed of sections from the peaks of the input voltage waveforms, resulting in a higher r.m.s. voltage ripple.

The maximum output voltage with the new scheme is shown in FIG. 17(b). The maximum peak value of $v_r$ is $3/\pi$ or about 95% of the peak value of the input voltage, which is the same as can be obtained without power factor improvement.

5.3 Input Subharmonics

The problem of input subharmonics can be seen clearly in FIG. 18(d). Here, a D.C. component of the input current is present. In this example, the output frequency is one half the input frequency, so the D.C. component is probably due to the $f_i - 2f_o$ intermodulation product.

The presence of input subharmonic currents is likely to be a problem only if the mains transformer feeding the cycloconverter is near the rating of the cycloconverter. In this situation, the transformer may go too far into saturation.

APPENDIX I

Determination of Stability Constant, K

To get a rough idea of the optimum value of the stability constant, K, an approximate stimulation of one output of the cycloconverter was undertaken. The input and output waveforms were approximated to the waveforms shown in FIG. 19. Time and voltage are assumed to be normalised to the values shown in this figure. It is assumed that positive current is flowing from the output and that the output reference voltage is constant at 0.5.

Figure 16:
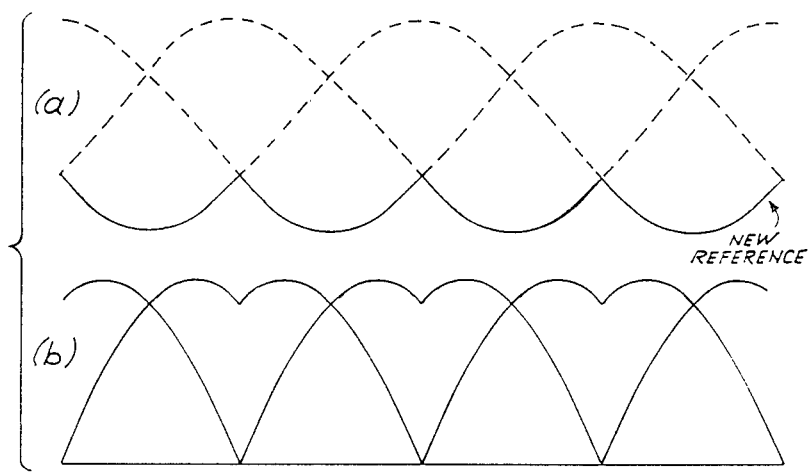

For the trigger period $t_1$ to $t_2$ as shown in FIG. 16, equation (6) becomes:

$$0 = t_\alpha^2 - t_\alpha(1.5 + 2K) + 0.5K + (1/6) + 2A \quad \text{(A1)}$$

where $$A = \int_0^{t_1} (v_o - v_r) dt$$

Solving this for $t_\alpha$:

$$t_\alpha = K + \frac{3}{4} - \sqrt{\left(K^2 + K + \frac{19}{48} - 2A\right)} \quad 3/$$

The value of A for the start of the next period is given by:

$$A(\text{next}) = \int_0^{t_2} (v_o - v_r) dt$$

$$= -t_\alpha + \frac{1}{4} + A$$

The variation in the value of A from period to period is a good indication of stability. To determine stability, A was initially set to zero and then calculated for each subsequent period for different values of K. The results are listed below:

TABLE A1

| Period elapsed | Value of A (% of final value) |
|---|---|
| | Simulation Results |
| | K = 0.4 |
| 0 | 0 |
| 1 | 106.515142953 |
| 2 | 99.254741406 |
| 3 | 100.0825289 |
| 4 | 99.990826713 |
| 5 | 100.001019211 |
| 6 | 99.999886754 |
| | K = 0.5 |
| 0 | 0 |
| 1 | 96.598008990 |
| 2 | 99.995790914 |
| 3 | 99.999999993 |
| 4 | 100.000000000 |
| 5 | 100.000000000 |
| 6 | 100.000000000 |
| | K = 0.6 |
| 0 | 0 |
| 1 | 88.323517689 |
| 2 | 98.9014162177 |
| 3 | 99.899798382 |
| 4 | 99.990888016 |
| 5 | 99.999171616 |
| 6 | 99.999924695 |

The above results indicate that the best value of K is about 0.5. This gives the fastest settling time to equilibrium conditions.

I claim:

1. In a static power frequency changer connecting one or more input phases to one or more outputs,
    said changer comprising one or more electronic switching means comprising a plurality of electronic switches, modulation means to sequentially activate individual switches of said electronic switching means, said electronic switching means connecting an AC voltage supply comprising said one or more input phases to an output of said one or more outputs, so that the output voltage waveform ($v_0$) at said output is built up of sections of input voltage waveforms on said one or more input phases;

a method of selecting, for each said output, an instant of switching ($t_f$) of the input waveform to be connected to said output, wherein:

for each output said instant of switching is chosen so that the average over a predetermined time interval of the difference between the continuous integral of the desired output voltage ($v_r$) and an estimate of the continuous integral of the actual output voltage is minimised, said predetermined time interval including said instant of switching to another input waveform.

2. The method of claim 1, said method excluding the special case of equations (14) or (15) having $M=0$ for each trigger period, equation (14) being:

$$\int_0^{t_2} (v_o - v_r)dt = M \tag{14}$$

where M is a constant, and equation (15) being:

$$\int_0^{t_1} (v_o - v_r)dt + \int_{t_1}^{t_2} (v_t - v_r)dt - \int_{t_1}^{t_f} (v_t - v_o)dt = M \tag{15}$$

where
M is a constant,
$v_t$ is the input voltage connected to the electronic switch to be triggered in a trigger period
$\sim$, $t_1$ is the start of said predetermined time interval, and $t_2$ is the end of said predetermined time interval.

3. The method of claim 2 wherein said predetermined time interval does not necessarily end at said instant of switching.

4. The method of claim 3 wherein said predetermined time interval includes only one said instant of switching determined by said method.

5. The method of claim 4 wherein said predetermined time interval is a representative one of a plurality of identical consecutive predetermined time intervals, and the end of each predetermined time interval coincides with the start of a next predetermined time interval.

6. The method of claim 5 wherein the start of said predetermined time interval is defined as the time of intersection of a first input voltage waveform with said desired output voltage waveform and the end of said predetermined time interval is defined as the time of intersection of a second input voltage waveform with said desired output voltage waveform;

said first input voltage waveform being the last input voltage waveform connected to said output prior to said instant of switching; and said second input voltage waveform being the input voltage waveform to be connected to said output at said instant of switching.

7. The method of claim 6, said method further including the provision of system stabilising means to render the output waveform stable.

8. The method of claim 7 wherein said system stabilising means comprises means to minimise or eliminate oscillation of the continuous integral of the difference between said output voltage waveform and said desired output voltage waveform at the end of consecutive ones of said predetermined time interval.

9. The method of claim 8 wherein the instant of switching is chosen so that the integral from the start ($t_1$) to the end ($t_2$) of said predetermined time interval of the difference between said output voltage waveform and said desired output voltage waveform is minimized.

10. The method of claim 9 wherein said average is minimised and said integral of said difference is minimised by finding a solution to equation (6), equation (6) being $$\theta = \int_{t_1}^{t_2} \int_\theta^t (v_o - v_r)dt^2 + K(t_2 - t_1) \int_{t_1}^{t_2} (v_o - v_r)dt \tag{6}$$

where K is a constant, the choice of which depends on the degree of stability required.

11. The method of claim 10 wherein the equation of claim 10 is expanded so that no integrations start from said time of switching.

12. The method of claim 11 wherein the equation of claim 10 is expanded to equation (7), equation (7) being:

$$\theta = \tag{7}$$

$$\left. \begin{array}{l} \int_{t_\theta}^{t_2} \int_{t_\theta}^t v_r dt^2 - \int_{t_1}^{t_2} \int_\theta^t v_r dt^2 \\ + K(t_2 - t_1) \int_{t_\theta}^{t_2} v_r dt - K(t_2 - t_1) \int_{t_1}^{t_2} v_r dt \end{array} \right\}(a)$$

$$\left. - K(t_2 - t_1) \int_\theta^{t_1} v_o dt \right\}(b)$$

$$\left. + \int_{t_1}^{t_f} \int_\theta^t v_o dt^2 \right\}(c)$$

$$\left. \begin{array}{l} - \int_{t_\theta}^{t_f} \int_{t_\theta}^t v_r dt^2 + (t_2 - t_f) \int_\theta^{t_f} v_o dt + \\ K(t_2 - t_1) \int_\theta^{t_f} v_o dt \\ - (t_2 - t_f) \int_{t_\theta}^{t_f} v_r dt - K(t_2 - t_1) \int_{t_\theta}^{t_f} v_r dt \end{array} \right\}(d)$$

13. The method of claim 9 wherein said average is minimised and said integral of said difference is minimised by finding a solution to equation (13), equation (13) being:

$$\int_0^{t_2} (v_o - v_r)dt = \frac{-1}{(t_2 - t_1)} \int_{t_1}^{t_2} \int_{t_1}^t (v_o - v_r)dt^2 \tag{13}$$

14. The method of claim 13 wherein the equation of claim 13 is expanded so that no integrations start from said time of switching.

15. The method of claim 14 wherein an approximation is made to the RHS of equation (13).

16. The method of claim 13 wherein an approximation is made to the RHS of equation (13).

17. The method of claim 3, said method further including the provision of system stabilising means to render the output waveform stable.

18. The method of claim 17 wherein said system stabilising means comprises means to minimise or eliminate oscillation of the continuous integral of the difference between said output voltage waveform and said desired output voltage waveform at consecutive ends of ones of said predetermined time interval.

19. The method of claim 18 wherein the instant of switching is chosen so that the difference between the values of the continuous integral of the difference between said output voltage waveform and said desired output voltage waveform at the end of said predetermined time interval and at a previous end of a selected one of said ones of said predetermined time interval is minimised; and wherein the degree of minimisation of said average with respect to the degree of minimisation of said difference is chosen according to the stability requirements of the specific application.

20. The method of claim 19 wherein said predetermined time interval includes only one said instant of switching.

21. The method of claim 2 wherein said plurality of electronic switches comprises naturally commutated thyristors.

22. The method of claim 21 wherein said predetermined time interval does not necessarily end at said instant of switching.

23. The method of claim 22 wherein said predetermined time interval includes only one said instant of switching determined by said method.

24. The method of claim 23 wherein said predetermined time interval is a representative one of a plurality of identical consecutive predetermined time intervals, and the end of each predetermined time interval coincides with the start of a next predetermined time interval.

25. The method of claim 24 wherein the start of said predetermined time interval is defined as the time of intersection of a first input voltage waveform with said desired output voltage waveform and the end of said predetermined time interval is defined as the time of intersection of a second input voltage waveform with said desired output voltage waveform;

said first input voltage waveform being the last input voltage waveform connected to said output prior to said instant of switching; and said second input voltage waveform being the input voltage waveform to be connected to said output at said instant of switching.

26. The method of claim 25, said method further including the provision of system stabilising means to render the output waveform stable.

27. The method of claim 26 wherein said system stabilising means comprises means to minimise or eliminate oscillation of the continuous integral of the difference between said output voltage waveform and said desired output voltage waveform at the end of consecutive ones of said predetermined time interval.

28. The method of claim 27 wherein the instant of switching is chosen so that the integral from the start ($t_1$) to the end ($t_2$) of said predetermined time interval of the difference between said output voltage waveform and said desired output voltage waveform is minimized.

29. The method of claim 28 wherein said average is minimised and said integral of said difference is minimised by finding a solution to equation (6), equation (6) being:

$$\theta = \int_{t_1}^{t_2} \int_{\theta}^{t} (v_o - v_r) dt^2 + K(t_2 - t_1) \int_{t_1}^{t_2} (v_o - v_r) dt \quad (6)$$

where K is a constant, the choice of which depends on the degree of stability required.

30. The method of claim 29 wherein the equation of claim 29 is expanded so that no integration start from said time of switching.

31. The method of claim 30 wherei the equation of claim 29 is expanded to equation (7), equation (7) being:

$$\theta = \quad (7)$$

$$\left.\begin{array}{l} \int_{t_\theta}^{t_2} \int_{t_\theta}^{t} v_r dt^2 - \int_{t_1}^{t_2} \int_{\theta}^{t} v_r dt^2 \\ + K(t_2 - t_1) \int_{t_\theta}^{t_2} v_r dt - K(t_2 - t_1) \int_{t_1}^{t_2} v_r dt \end{array}\right\}(a)$$

$$\left.- K(t_2 - t_1) \int_{\theta}^{t_1} v_o dt \right\}(b)$$

$$\left.+ \int_{t_1}^{t_f} \int_{\theta}^{t} v_o dt^2 \right\}(c)$$

$$\left.\begin{array}{l} - \int_{t_\theta}^{t_f} \int_{t_\theta}^{t} v_r dt^2 + (t_2 - t_f) \int_{\theta}^{t_f} v_o dt + \\ K(t_2 - t_1) \int_{\theta}^{t_f} v_o dt \\ - (t_2 - t_f) \int_{t_\theta}^{t_f} v_r dt - K(t_2 - t_1) \int_{t_\theta}^{t_f} v_r dt \end{array}\right\}(d)$$

32. The method of claim 28 wherein said average is minimised and said integral of said difference is minimised by finding a solution to equation (13), equation (13) being:

$$\int_o^{t_2} (v_o - v_r) dt = \frac{-1}{(t_2 - t_1)} \int_{t_1}^{t_2} \int_{t_1}^{t} (v_o - v_r) dt^2 \quad (13)$$

33. The method of claim 32 wherein the equation of claim 32 is expanded so that no integrations start from said time of switching.

34. The method of claim 33 wherein an approximation is made to the RHS of equation (13).

35. The method of claim 32 wherein an approximation is made to the RHS of equation (13).

36. The method of claim 22, said method further including the provision of system stabilising means to render the output waveform stable.

37. The method of claim 36 wherein said system stabilising means comprises means to minimise or eliminate oscillation of the continuous integral of the difference between said output voltage waveform and said desired output voltage waveform at consecutive ends of ones of said predetermined time interval.

38. The method of claim 37 wherein the instant of switching is chosen so that the difference between the values of the continuous integral of the difference between said output voltage waveform and said desired output voltage waveform at the end of said predetermined time interval and at a previous end of a selected one of said ones of said predetermined time interval is minimised; and wherein the degree of minimisation of said average with respect to the degree of minimisation of said difference is chosen according to the stability requirements of the specific application.

39. The method of claim 38 wherein said predetermined time interval includes only one said instant of switching.

40. A static power frequency changer connecting one or more input phases to one or more outputs, said changer comprising one or more electronic switching means comprising a plurality of electronic switches, modulation means to sequentially activate individual switches of said electronic switching means, said electronic switching means connecting an AC voltage supply comprising said one or more input phases to an output of said one more outputs, so that the output voltage waveform ($v_0$) at said output is built up of sections of input voltage waveforms on said one or more input phases;

said modulation means including means for selecting, for each said output, an instant of switching ($t_f$) of the input waveform to be connected to said output, wherein:

for each output said instant of switching is chosen so that the average over a predetermined time interval of the difference between the continuous integral of the desired output voltage ($v_r$) and an estimate of the continuous integral of the actual output voltage is minimised, said predetermined time interval including said instant of switching to another input waveform.

41. The changer of claim 40, wherein said modulation means excludes the special case of equations (14) or (15) having M=0 for each trigger period, equation (14) being:

$$\int_0^{t_2} (v_o - v_r)dt = M \qquad (14)$$

where M is a constant, and equation (15) being:

$$\int_0^{t_1} (v_o - v_r)dt + \int_{t_1}^{t_2} (v_t - v_r)dt - \int_{t_1}^{t_f} (v_t - v_o)dt = M \qquad (15)$$

where
M is a constant,
$v_t$ is the input voltage connected to the electronic switch to be triggered in a trigger period
$t_1$ is the start of said predetermined time interval, and
$t_2$ is the end of said predetermined time interval.

42. The changer of claim 41 wherein said predetermined time interval does not necessarily end at said instant of switching.

43. The changer of claim 42 wherein said predetermined time interval includes only one said instant of switching determined by said method.

44. The changer of claim 43 wherein said predetermined time interval is a representative one of a plurality of identical consecutive predetermined time intervals, and the end of each predetermined time interval coincides with the start of a next predetermined time interval.

45. The changer of claim 44 herein the start of said predetermined time interval is defined as the time of intersection of a first input voltage waveform with said desired output voltage waveform and the end of said predetermined time interval is defined as the time of intersection of a second input voltage waveform with said desired output voltage waveform;

said first input voltage waveform being the last input voltage waveform connected to said output prior to said instant of switching; and said second input voltage waveform being the input voltage waveform to be connected to said output at saad instant of switching.

46. The changer of claim 45, said changer further including the provision of system stabilising means to render the output waveform stable.

47. The changer of claim 46 wherein said system stabilising means comprises means to minimise or eliminate oscillation of the continuous integral of the difference between said output voltage waveform and said desired output voltage waveform at the end of consecutive ones of said predetermined time interval.

48. The changer of claim 47 wherein the instant of switching is chosen so that the integral from the start ($t_1$) to the end ($t_2$) of said predetermined time interval of the difference between said output voltage waveform and said desired output voltage waveform is minimized.

49. The changer of claim 48 wherein said average is minimised and said difference is minimised by finding a solution to equation (6), equation (6) being:

$$\theta = \int_{t_1}^{t_2}\int_\theta^t (v_o - v_r)dt^2 + K(t_2 - t_1)\int_{t_1}^{t_2}(v_o - v_r)dt \qquad (6)$$

50. The changer of claim 49 wherein the equatin of claim 49 is expanded so that no integrations start from said time of switching.

51. The changer of claim 50 wherein the equation of claim 49 is expanded to equation (7), equation (7) being:

$$\theta = \qquad (7)$$

$$\left.\begin{array}{l}\int_{t_\theta}^{t_2}\int_{t_\theta}^t v_r dt^2 - \int_{t_1}^{t_2}\int_\theta^t v_r dt^2 \\ + K(t_2 - t_1)\int_{t_\theta}^{t_2} v_r dt - K(t_2 - t_1)\int_{t_1}^{t_2} v_r dt\end{array}\right\}(a)$$

$$\left.- K(t_2 - t_1)\int_\theta^{t_1} v_o dt\right\}(b)$$

-continued $$+ \int_{t_1}^{t_f} \int_\theta^t v_o dt^2 \Bigg\}(c)$$

$$-\int_{t_\theta}^{t_f} \int_{t_\theta}^t v_r dt^2 + (t_2 - t_f) \int_\theta^{t_f} v_o dt +$$

$$K(t_2 - t_1) \int_\theta^{t_f} v_o dt \Bigg\}(d)$$

$$-(t_2 - t_f) \int_{t_\theta}^{t_f} v_r dt - K(t_2 - t_1) \int_{t_\theta}^{t_f} v_r dt \Bigg\}$$

52. The changer of claim 48 wherein said average is minimised and said integral of said difference is minimised by finding a solution to equation (13), equation (13) being:

$$\int_o^{t_2} (v_o - v_r) dt = \frac{-1}{(t_2 - t_1)} \int_{t_1}^{t_2} \int_{t_1}^t (v_o - v_r) dt^2 \qquad (13)$$

53. The changer of claim 52 wherein the equation of claim 52 is expanded so that no integraations start from said time of switching.

54. The changer of claim 53 wherein an approximation is made to the RHS of equation (13).

55. The changer of claim 52 wherein an approximation is made to the RHS of equation (13).

56. The changer of claim 42, said changer further including the provision of system stabilising means to render the output waveform stable.

57. The changer of claim 56 wherein said system stabilising means comprises means to minimise or eliminate oscillation of the continuous integral of the difference between said output voltage waveform and said desired output voltage waveform at consecutive ends of ones of said predetermined time interval.

58. The changer of claim 57 wherein the instant of switching is chosen so that the difference between the values of the continuous integral of the difference between said output voltage waveform and said desired output voltage waveform at the end of said predetermined time interval and at a previous end of a selected one of said ones of said predetermined time interval is minimised; and
wherein the degree of minimisation of said average with respect to the degree of minimisation of said difference is chosen according to the stability requirements of the specific application.

59. The changer of claim 58 wherein said predetermined time interval includes only one said instant of switching.

60. The changer of claim 41 wherein said plurality of electric switches comprises naturally commutated thyristors.

61. The changer of claim 60 wherein said predetermined time interval does not necessarily end at said instant of switching.

62. The changer of claim 61 wherein said predetermined time interval includes only one said instant of switching determined by said method.

63. The changer of claim 62 wherein said predetermined time interval is a representative one of a plurallity of identical consecutive predetermined time intervals, and the end of each predetermined time interval coincides with the start of a next predetermined time interval.

64. The changer of claim 63 herein the start of said predetermined time interval is defined as the time of intersection of a first input voltage waveform with said desired output voltage waveform and the end of said predetermined time interval is defined as the time of intersection of a second input voltage waveform with said desired output voltage waveform;
said first input voltage waveform being the last input voltage waveform connected to said output prior to said instant of switching; and
said second input voltage waveform being the input voltage waveform to be connected to said output at said instant of switching.

65. The changer of claim 64, said changer further including the provision of system stabilising means to render the output waveform stable.

66. The changer of claim 65 wherein said system stabilising means comprises means to minimise or eliminate oscillation of the continuous integral of the difference between said output voltage waveform and said desired output voltage waveform at the end of consecutive ones of said predetermined time interval.

67. The changer of claim 66 wherein the instant of switching is chosen so that the integral from the start ($t_1$) to the end ($t_2$) of said predetermined time interval of the difference between said output voltage waveform and said desired output voltage waveform is minimized.

68. The changer of claim 67 wherein said average is minimised and said difference is minimised by finding a solution to equation (6), equation (6) being:

$$\theta = \int_{t_1}^{t_2} \int_\theta^t (v_o - v_r) dt^2 + K(t_2 - t_1) \int_{t_1}^{t_2} (v_o - v_r) dt \qquad (6)$$

where K is a constant, the choice of which depends on the degree of stability required.

69. The changer of claim 68 wherein the equation of claim 68 is expanded so that no integrations start from said time of switching.

70. The changer of claim 69 wherein the equation of claim 68 is expanded to equation (7), equation (7) being:

$$\theta = \qquad (7)$$

$$\int_{t_\theta}^{t_2} \int_{t_\theta}^t v_r dt^2 - \int_{t_1}^{t_2} \int_\theta^t v_r dt^2$$

$$+ K(t_2 - t_1) \int_{t_\theta}^{t_2} v_r dt - K(t_2 - t_1) \int_{t_1}^{t_2} v_r dt \Bigg\}(a)$$

$$- K(t_2 - t_1) \int_\theta^{t_1} v_o dt \Bigg\}(b)$$

$$+ \int_{t_1}^{t_f} \int_\theta^t v_o dt^2 \Bigg\}(c)$$

-continued $$-\int_{t_\theta}^{t_f}\int_{t_\theta}^{t} v_r dt^2 + (t_2 - t_f)\int_\theta^{t_f} v_o dt +$$

$$K(t_2 - t_1)\int_\theta^{t_f} v_o dt$$

$$-(t_2 - t_f)\int_{t_\theta}^{t_f} v_r dt - K(t_2 - t_1)\int_{t_\theta}^{t_f} v_r dt \bigg\} \quad (d)$$

71. The changer of claim 67 wherein said average is minimised and said integral of said difference is minimised by finding a solution to equation (13), equation (13) being:

$$\int_o^{t_2} (v_o - v_r)dt = \frac{-1}{(t_2 - t_1)} \int_{t_1}^{t_2}\int_{t_1}^{t} (v_o - v_r)dt^2 \quad (13)$$

72. The changer of claim 71 wherein the equation of claim 71 is expanded so that no integrations start from said time of switching.

73. The changer of claim 72 wherein an approximation is made to the RHS of equation (13).

74. The changer of claim 71 wherein an approximation is made to the RHS of equation (13).

75. The changer of claim 61 wherein said static power frequency changer is connected as a three pulse three input phase three output phase cycloconverter.

76. The changer of claim 61 wherein said static power frequency changer is connected as a six pulse three input phase three output phase cycloconverter.

77. The changer of claim 61 wherein said static power frequency changer is connected as a two pulse single input phase two output phase cycloconverter.

78. The changer of claim 61, said changer further including the provision of system stabilising means to render the output waveform stable.

79. The changer of claim 78 wherein said system stabilising means comprises means to minimise or eliminate oscillation of the continuous integral of the difference between said output voltage waveform and said desired output voltage waveform at consecutive ends of said predetermined time interval.

80. The changer of claim 79 wherein the instant of switching is chosen so that the difference between the values of the continuous integral of the difference between said output voltage waveform and said desired output voltage waveform at the end of said predetermined time interval and at a previous end of a selected one of said ones of said predetermined time interval is minimised; and wherein the degree of minimisation of said average with respect to the degree of minimisation of said difference is chosen according to the stability requirements of the specific application.

81. The changer of claim 80 wherein said predetermined time interval includes only one said instant of switching.

* * * * *